W. F. POLSON.
FOLDING SEAT FOR AUTOMOBILES.
APPLICATION FILED FEB. 9, 1917. RENEWED JAN. 17, 1920.

1,333,338.

Patented Mar. 9, 1920.
2 SHEETS—SHEET 1.

Witness:
E. M. Schweiger.

William F. Polson, Inventor.
By Emil Keuhart
Attorney.

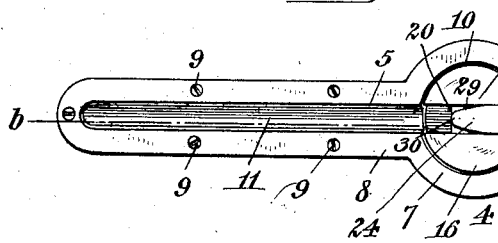

UNITED STATES PATENT OFFICE.

WILLIAM F. POLSON, OF BUFFALO, NEW YORK.

FOLDING SEAT FOR AUTOMOBILES.

1,333,338.  Specification of Letters Patent.  Patented Mar. 9, 1920.

Application filed February 9, 1917, Serial No. 147,598. Renewed January 17, 1920. Serial No. 352,169.

*To all whom it may concern:*

Be it known that I, WILLIAM F. POLSON, a citizen of the United States, residing at Buffalo, in the county of Erie and State of New York, have invented certain new and useful Improvements in Folding Seats for Automobiles, of which the following is a specification.

My invention relates to improvements in folding seats for automobiles, such as are used intermediate the main front and rear seats.

The primary object of my invention is the provision of a folding seat of simple and durable construction, which is capable of revolving so that the person occupying the seat may face either forward, rearward or sidewise in either direction and at any desired angle, the construction of the seat being such as to afford ample leg room regardless of the position in which the seat may be placed.

A further object of my invention is to provide a seat of this type having novel means to prevent tipping of the seat when elevated, and also to prevent side swaying of the seat.

With these and other objects in view, the invention consists in the novel construction and in the combination and arrangement of parts to be hereinafter described and particularly pointed out in the subjoined claims.

In the accompanying drawings illustrating the invention.

Fig. 3 is a plan view of the folding seat, the seat board and back being untrimmed.

Fig. 4 is a longitudinal section taken on line *b—b*, Fig. 3, the support or receiver being, however, shown fitted into the floor of the automobile body.

Fig. 5 is a perspective view of the lower portion of the seat standard.

Fig. 6 is a cross section through the support or receiver, taken on line *c—c*, Fig. 4.

Fig. 7 is an enlarged cross section taken on line *d—d*, Fig. 4.

Fig. 8 is a perspective view of the rotatable spool to which the seat standard is pivotally connected.

Fig. 9 is an enlarged horizontal section taken on line *e—e*, Fig. 4, the floor of the automobile body being omitted.

Fig. 10 is an enlarged horizontal section taken on line *f—f*, Fig. 4, the floor of the automobile body being omitted.

Referring now to the drawings in detail, like numerals of reference refer to like parts in the several figures.

Figure 1:
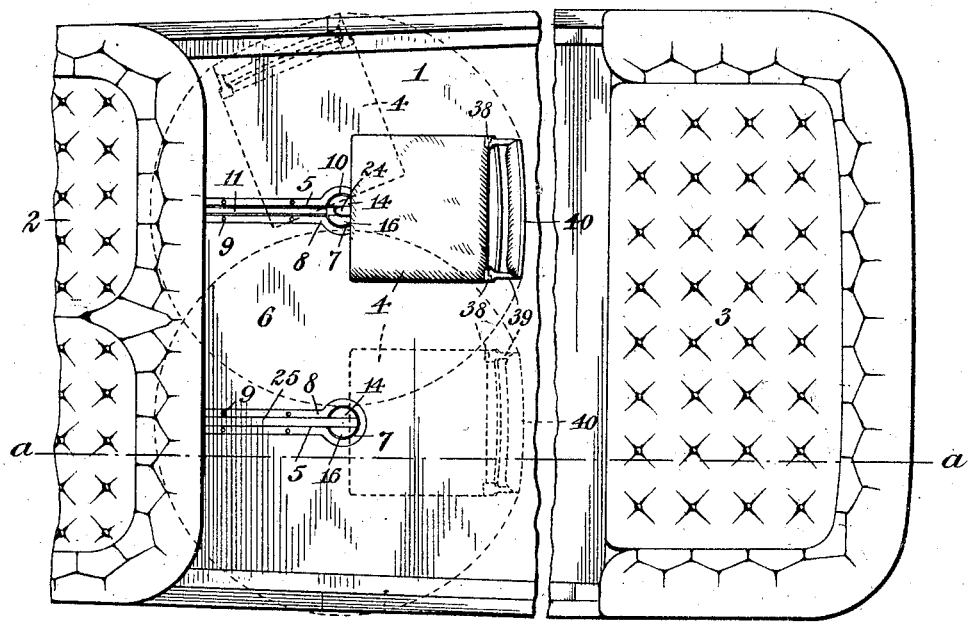
Figure 1 is a broken plan view of a portion of an automobile body equipped with two of my improved folding seats, one of which is shown in position for use and the other in folded position.
Figure 2:
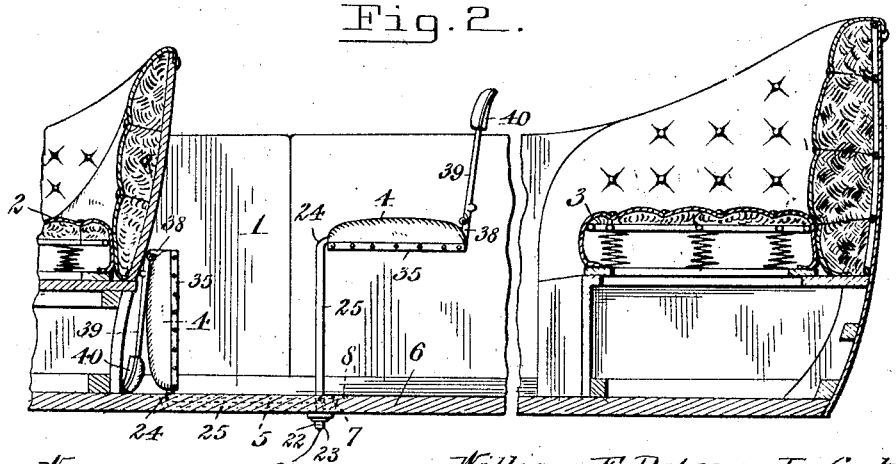
Fig. 2 is a longitudinal section taken on line *a—a*, Fig. 1.

The automobile body, designated by the numeral 1 is provided with a front seat 2, and a rear seat 3. 4 designates my improved folding seat, one or more of which may be placed intermediate the front and rear seats of the automobile body, and in this instance I have shown two folding seats. Each of these seats is pivotally connected to a suitable support in the form of a slotted casting or receiver 5 which is let into the floor 6 of the automobile body, this support or receiver being of elongated trough-like formation with an enlargement 7 at its rear end and a flange 8 extending outwardly along the upper edge through which screws 9 or other fastening means may be passed that take into or extend through the floor of the automobile body, as may be desired.

The enlargement 7 is of greater depth than the remainder of said support or receiver and is preferably circular in cross section, it being slightly tapered, as best shown in Fig. 4, the interior of said enlargement forming a circular receiving pocket 10 into which the elongated trough 11 opens at its rear end. This support may therefore be said to possess an elongated receiving pocket provided at its rear end with a circular portion or pocket.

The upper face of the outstanding flange 8 is adapted to be arranged flush with the upper face of the floor of the automobile body and the carpet or other floor covering of said body is adapted to cover said flanges, an opening being left in said carpet or other covering of the same width as the elongated trough or pocket and the circular enlargement in said support. The bottom of said circular enlargement is provided with a circular depression 12 and it also has an axial opening 13.

14 designates a revolving spool or turn table and comprises a body portion 15 having an outwardly-directed flange or table 16 at its upper end and a similar flange or table 17 at its lower end, the end face of said lower flange being in contact with the elevated portion 18 of the bottom wall of said circular pocket. Said spool is provided on its underside with a circular boss 19 which projects into the circular depression 12 of said bottom wall but is spaced from the walls of said circular depression.

The spool or turn table is forked at its upper end, as at 20, and extending axially through the lower portion of the spool or turn table is a pivot or screw 21 which extends through the axial opening 13 in the bottom wall of the circular pocket 10 and has a securing nut 22 threaded thereonto and a jam nut 23 in contact with said securing nut, the spool or turn table being adapted to rotate with said pin or screw as its axis.

24 represents an L-shaped standard which, when the seat is elevated, provides a vertical portion 25 and a horizontal portion 26, the lower end of said vertical portion being pivotally connected to said spool or turn table by inserting the extremity thereof into the forked portion of said spool or turn table and passing a horizontal pivot pin or screw 27 through the body of said spool or turn table and said extremity, a nut 28 being threaded onto said pin or screw to hold the parts in pivotally connected relation.

The vertical portion 25 of said L-shaped standard is tapered from rear to front, as at 29, and rounded at its front edge, as at 30, so that in swinging the standard downwardly into the trough of the support or receiver, free action is assured. Moreover, the sides of the standard are thus fitted more perfectly to the trough of the support, the side walls of which are flared upwardly, with the result that all play is eliminated between the two parts when the seat is folded.

The standard is provided at its lower extremity with a depending lug 31 which serves as a stop to prevent swinging movement of the standard beyond the desired position, said stop having its front face beveled, as at 32, and being adapted to bear against the inclined rear face 33 of the lower or body portion of the spool, as clearly shown in Fig. 4. When the standard is swung downwardly into the position shown in dotted lines in Fig. 4, the side faces thereof lie in contact with the side walls of the trough of the support and the rear face 34 of said standard is flush with the upper face of the outstanding flange 8.

It is also to be noted that the upper face of the spool or turn table is flush with the upper face of said outstanding flange 8 so that all projecting parts are avoided when the seat is folded.

To the horizontal portion of the standard 24, a seat board 35 is secured, said horizontal portion having lateral arms 36 through which screws are passed that take into said seat board. At the rear of said seat board, brackets 37 are secured, said brackets having upstanding portions 38 to which the frame 39 of the seat back is pivotally secured, said frame being provided at its upper end with a back support or board 40 which may be upholstered in any approved manner, or if desired, the entire seat back may be upholstered. The seat board 35 may also be upholstered in any approved manner.

When the seat is elevated it may be rotated to any desired angle by revolving the same on the vertical pivot pin or screw 21 and regardless of the position to which the seat is swung, the parts are so arranged that suitable leg room is provided at all times. When, however, the seat is to be folded it is necessary that it be faced forwardly to bring the vertical portion of the standard in line with the trough of the support. It is then simply necessary to fold the seat back onto the seat board and thence swing the standard 24 on the horizontal pivot or screw 27. The vertical portion of the standard then assumes a horizontal position while the horizontal portion and the seat board assume a vertical position with the seat back in a vertical position in front of the seat board.

If desired, a strip of carpet or other floor covering to match the carpet or floor covering of the automobile body, may be secured to the rear face 34 of the vertical portion of the standard, and when the latter is swung into the trough of the support this covering will close the slot or open space of the carpet or other covering of said floor.

Having thus described my invention, what I claim is,—

1. A folding seat for automobiles, comprising a standard provided with a depending lug having its front face beveled, a supporting member fitting into the bottom of the automobile and having a longitudinally-disposed trough and a circular pocket at one end of said trough, a rotatable member within said pocket provided with outstanding flanges at its upper and lower ends and with an inclined rear face in a plane between said flanges against which the beveled front face of said lug is adapted to bear, a pivot pin passing through said rotatable member in a plane between said flanges and pivotally securing said standard to said rotatable member, and a pivot pin whereby said rotatable member is connected to said supporting member.

2. A folding seat for automobiles, comprising a standard, a support having a circular pocket, a rotatable member within said pocket provided with outstanding flanges at its upper and lower ends, a pivot pin passing through said rotatable member in a plane between said flanges and pivotally securing said standard to said rotatable member, and a pivot pin whereby said rotatable member is connected to said support.

3. A folding seat for automobiles, comprising a support having an elongated portion provided with an elongated narrow pocket and a circular enlargement or pocket at the rear end of said elongated narrow pocket, the bottom wall of said circular enlargement or pocket having a central depression and an axial pivot hole, a rotatable member provided with an outstanding flange at its lower end bearing against the bottom wall of said circular enlargement or pocket and having a central boss on its underside extending into the central depression in said bottom wall, said rotatable member being forked at its upper end, a pivot extending vertically through said rotatable member from its forked portion and projecting through the bottom wall of said circular enlargement or pocket, a standard having its lower end fitting into the forked upper end of said rotatable member, and a horizontal pivot passing through the forked portion of said rotatable element and the inserted end of said standard.

4. A folding seat for automobiles having a standard provided with a single depending member, a support secured to the floor of an automobile and having a pocket at its rear end, a member rotatable on a vertical axis fitting within said pocket and having a forked portion adapted to receive the lower end of said single depending member, said single depending member having a downwardly extending stop lug and said rotatable member having a flat rear face against which the front face of said stop lug bears, and a horizontal pivot connecting said single depending member of the standard with said rotatable member.

In testimony whereof I affix my signature.

WILLIAM F. POLSON.